US010954330B2

(12) United States Patent
Rössle et al.

(10) Patent No.: US 10,954,330 B2
(45) Date of Patent: Mar. 23, 2021

(54) USE OF SPECIFIC AMINOSILYL MONOMERS IN THE MANUFACTURE OF RUBBER

(71) Applicant: TRINSEO EUROPE GMBH, Horgen (CH)

(72) Inventors: Michael Rössle, Merseburg (DE); Sven Thiele, Halle (DE); Dominique Thielemann, Leipzig (DE)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 16/623,610

(22) PCT Filed: Jul. 26, 2018

(86) PCT No.: PCT/EP2018/070302
§ 371 (c)(1),
(2) Date: Dec. 17, 2019

(87) PCT Pub. No.: WO2019/020752
PCT Pub. Date: Jan. 31, 2019

(65) Prior Publication Data
US 2020/0377636 A1    Dec. 3, 2020

(30) Foreign Application Priority Data

Jul. 27, 2017 (EP) .................................. 17183493

(51) Int. Cl.
| | |
|---|---|
| *C08F 236/06* | (2006.01) |
| *C08F 212/08* | (2006.01) |
| *C08F 236/08* | (2006.01) |
| *C08G 77/26* | (2006.01) |
| *C08K 5/56* | (2006.01) |
| *B60C 1/00* | (2006.01) |
| *C08L 19/00* | (2006.01) |

(52) U.S. Cl.
CPC .......... *C08F 236/06* (2013.01); *B60C 1/0016* (2013.01); *B60C 1/0025* (2013.01); *B60C 1/0041* (2013.01); *C08F 212/08* (2013.01); *C08F 236/08* (2013.01); *C08G 77/26* (2013.01); *C08K 5/56* (2013.01); *C08L 19/006* (2013.01); *B60C 2001/0066* (2013.01)

(58) Field of Classification Search
CPC .... C08F 236/06; C08F 236/08; C08F 212/08; B60C 1/0016; B60C 1/0025; B60C 1/0041; B60C 2001/0066; C08G 77/26; C08K 5/56; C08L 19/006

USPC ......................................................... 526/335
See application file for complete search history.

(56) References Cited

U.S. PATENT DOCUMENTS

| | | | |
|---|---|---|---|
| 3,078,254 | A | 2/1963 | Zelinski |
| 3,244,664 | A | 4/1966 | Zelinski et al. |
| 3,281,383 | A | 10/1966 | Zelinski et al. |
| 3,692,874 | A | 9/1972 | Farrar et al. |
| 3,978,103 | A | 8/1976 | Meyer-Simon et al. |
| 4,048,206 | A | 9/1977 | Voronkov et al. |
| 4,474,908 | A | 10/1984 | Wagner |
| 4,616,069 | A | 10/1986 | Watanabe et al. |
| 6,229,036 | B1 | 5/2001 | Batz et al. |
| 6,777,569 | B1 | 8/2004 | Westmeyer et al. |
| 8,124,704 | B2 | 2/2012 | Oshima et al. |
| 8,299,167 | B2 | 10/2012 | Oshima |
| 8,765,892 | B2 | 7/2014 | Oshima |
| 2005/0124740 | A1 | 6/2005 | Degussa |
| 2005/0159513 | A1 | 7/2005 | Henning et al. |
| 2013/0131263 | A1 | 5/2013 | Nebhani et al. |

FOREIGN PATENT DOCUMENTS

| | | |
|---|---|---|
| DE | 3243141 | 4/1986 |
| WO | WO 2007/047943 | 4/2007 |
| WO | WO 2008/108377 | 9/2008 |
| WO | WO 2008/108377 A1 * | 9/2008 |
| WO | WO 2009/148932 | 12/2009 |
| WO | WO 2010/016264 | 5/2010 |
| WO | WO 2012/091753 | 7/2012 |
| WO | WO 2014/040639 | 3/2014 |
| WO | WO 2014/040640 | 3/2014 |
| WO | WO 2015/010710 | 1/2015 |
| WO | WO 2015/055252 | 4/2015 |

OTHER PUBLICATIONS

Search Report & Written Opinion issued in Int'l Appl. No. PCT/EP2018/070302 (dated 2018).

* cited by examiner

*Primary Examiner* — William K Cheung
(74) *Attorney, Agent, or Firm* — Barnes & Thornburg LLP; G. Peter Nichols

(57) ABSTRACT

The invention relates to the use of specific aminosilyl monomers in the manufacture of elastomeric polymers, especially rubber. The invention specifically relates to a process for preparing an elastomeric polymer, involving the copolymerization of the aminosilyl monomers, the elastomeric polymer thus obtained or obtainable, non-vulcanized and vulcanized polymer compositions comprising the elastomeric polymer, and articles comprising one or more components formed from the vulcanized polymer composition.

19 Claims, No Drawings

USE OF SPECIFIC AMINOSILYL MONOMERS IN THE MANUFACTURE OF RUBBER

This application is a U.S. nationalization under 35 U.S.C. § 371 of International Patent Application No. PCT/EP2018/070302, filed Jul. 26, 2018, which claims priority to EP Application No. 17183493.0, filed Jul. 27, 2017; the entire contents of each are incorporated herein by reference.

FIELD OF THE INVENTION

The present invention relates to the use of specific aminosilyl monomers in the manufacture of elastomeric polymers, especially rubber. In particular, the present invention relates to a process for preparing an elastomeric polymer, involving the copolymerization of the aminosilyl monomers, the elastomeric polymer thus obtained or obtainable, non-vulcanized and vulcanized polymer compositions comprising the elastomeric polymer, and articles comprising one or more components formed from the vulcanized polymer composition.

BACKGROUND OF THE INVENTION

Vinylsilane monomers, in particular aminovinylsilanes, are conventionally used as modifying agents, especially backbone-modifying agents, in elastomeric polymers (rubber). That is, the (backbone) modification allows a modified reaction and interaction of the polymer with fillers in a rubber vulcanizate as used in tires. Yet, secondary amines released from amine-containing aminovinylsilanes may potentially result in the formation of nitrosamines, which, when exuding from rubber products such as tires, have carcinogenic potential. Insofar, TRGS-552 ("Technische Regeln fuer Gefahrstoffe", Technical Rules for Hazardous Substances) applies.

DE 32 43 141 describes specific vulcanization accelerators which are based on and derived from inter alia secondary amines such that the vulcanization accelerators, when used in the manufacture of rubber products, do not generate carcinogenic nitrosamines.

Aminovinylsilanes are used in the rubber field as modifying monomers in the polymerization of diene monomers such as butadiene, optionally together with aromatic vinyl monomers such as styrene, to produce rubber which can favorably be used in the manufacture of fuel-efficient rubbers. One approach for obtaining fuel-efficient tires lies in the production of tire formulations having reduced hysteresis loss. The hysteresis loss of a cross-linked elastomeric polymer composition is related to its tan δ value at 60° C. (see ISO 4664-1:2005; Rubber, Vulcanized or thermoplastic; Determination of dynamic properties—part 1: General guidance). In general, vulcanized elastomeric polymer compositions having relatively low tan δ values at 60° C. are preferred for having lower hysteresis loss. In the final tire product, this translates into lower rolling resistance and better fuel economy. In contrast, lower tan δ values at 0° C. correspond to a deteriorated wet grip of the tire product, and it is generally accepted that a lower rolling resistance tire can be obtained at the expense of deteriorated wet grip. For example, if, in a random solution styrene-butadiene rubber (random SSBR), the polystyrene unit concentration is reduced with respect to the total polybutadiene unit concentration, the SSBR glass transition temperature is reduced and, as a result, both tan δ at 60° C. and tan δ at 0° C. are reduced, corresponding to improved rolling resistance and deteriorated wet grip performance of the tire. Accordingly, when assessing the rubber vulcanizate performance correctly, both tan δ at 60° C. and tan δ at 0° C. should be monitored along with the tire heat build-up.

WO2015/055252 describes vinylsilane compounds which are useful as modifying monomers in the polymerization of conjugated diene monomers to produce elastomeric polymers, which can be used in rubber articles such as tires.

U.S. Pat. No. 8,299,167 relates to a conjugated diene polymer obtained by polymerizing a conjugated diene monomer and a vinylaminosilane in the presence of an alkali metal catalyst.

WO 2012/091753 relates to silane-functionalized polymers and rubber vulcanizates prepared therefrom. The authors describe the use of certain alkenylaminosilanes for use in the initiation of anionic polymerizations.

The present invention aims the provision of a process for preparing an elastomeric polymer, and to the corresponding elastomeric polymer and associated products, wherein no or no volatile emissions of carcinogenic nitrosamines are generated in the manufacture and processing of the elastomeric polymer (especially during rubber compounding). The present invention further aims at the provision of elastomeric polymers which exhibit improved storage stability, in terms of Mooney viscosity (CML1-4), while having no or reduced emissions of carcinogenic nitrosamines during manufacture and processing. Finally, the present invention aims at the provision of such elastomeric polymers which exhibit the same or improved balance of processing and rolling resistance characteristics, while having no or reduced emissions of carcinogenic nitrosamines during manufacture and processing.

SUMMARY OF THE INVENTION

In a first aspect, the present invention provides a process for preparing an elastomeric polymer, said process comprising polymerizing one or more conjugated diene monomers, one or more aminosilyl monomers of the following Formula 1 and optionally one or more aromatic monovinyl monomers in the presence of one or more initiator compounds:

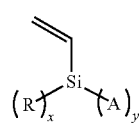

Formula 1 wherein x and y are integers with x+y=3 and y≥1; each R is independently selected from $C_1$-$C_{30}$ hydrocarbyl; and each A is independently an amino group selected from Formulas 2 to 8 as defined below.

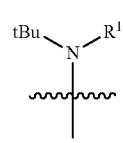

Formula 2 wherein tBu is tert-butyl and $R^1$ is $C_1$-$C_8$ alkyl.

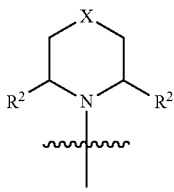

Formula 3 wherein each $R^2$ is independently selected from $C_1$-$C_8$ alkyl and —$CH_2$—O—$(CH_2)_{1-6}$—H, and X is selected from a bond, —O—, —$CH_2$— and —$CH_2CH_2$—.

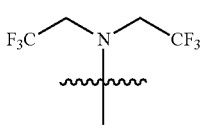

Formula 4

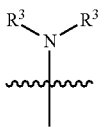

Formula 5 wherein each $R^3$ is independently selected from allyl, cyclohexyl, $C_8$-$C_{20}$ alkyl and —$(CH_2)_2$—$Y_m$—$CH_3$, wherein Y is independently selected from —$CH_2$—, —O— and —S—, m is an integer selected from 5 to 17 and at least one Y is selected from —O— and —S—, with the proviso that any group —O— and —S— is linked only to —$CH_2$— or —$CH_3$.

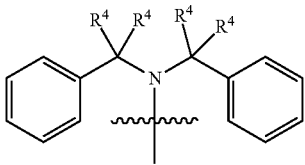

Formula 6 wherein each $R^4$ is independently selected from H and $C_1$-$C_8$ alkyl.

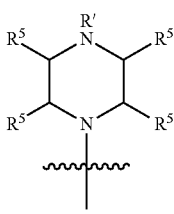

Formula 7 wherein R' is selected from methyl, ethyl, propyl, butyl, pentyl, hexyl and benzyl; and each $R^5$ is independently selected from H, methyl, ethyl and propyl.

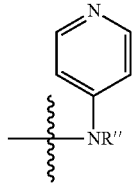

Formula 8 wherein R" is selected from linear or branched $C_1$-$C_8$ alkyl.

In a preferred embodiment of the first aspect of the present invention, the polymerization is carried out in the absence of a compound of the following Formula X or a compound obtainable by reacting a compound of Formula X with an organo-alkali metal compound. Formula X:

(D)-$E_n$ wherein D is an organic group having at least two amino groups, each E is independently selected from a group —Si($R^a$)($R^b$)($R^c$), wherein $R^a$, $R^b$ and $R^c$ are each independently selected from vinyl, butadienyl, methyl, ethyl, propyl, butyl, hexyl, octyl, phenyl and benzyl, with the proviso that at least one of $R^a$, $R^b$ and $R^c$ is selected from vinyl and butadienyl, wherein each group E is a substituent of an amino group of group D;

at least two of the amino groups of group D are each substituted with at least one group E;

n is an integer of at least 2, preferably an integer selected from 2 to 6; and all amino groups in group D are tertiary amino groups.

In a second aspect, the present invention provides an elastomeric polymer obtainable, or obtained, by the process as defined in the first aspect or any one of the embodiments thereof.

In a third aspect, the present invention provides a non-vulcanized polymer composition comprising the elastomeric polymer of the second aspect of the present invention and one or more further components selected from (i) components which are added to or formed as a result of the polymerization process used for making said polymer, (ii) components which remain after solvent removal from the polymerization process and (iii) components which are added to the polymer after completion of the polymer manufacturing process.

In a fourth aspect, the present invention provides a vulcanized polymer composition obtainable by vulcanizing the polymer composition of the third aspect of the present invention and one or more vulcanizing agents.

In a fifth aspect, the present invention provides a method of making a vulcanized polymer composition, comprising the step of vulcanizing the polymer composition of the third aspect of the present invention which comprises one or more vulcanizing agents.

In a sixth aspect, the present invention provides an article comprising at least one component formed from the vulcanized polymer composition of the fourth aspect of the present invention.

The present invention is based on the finding that amine protective groups in rubber compounds are prone to be released from aminovinylsilane-modified polymers in a typical polymer mixing process, i.e. in the presence of moisture, at elevated temperatures, e.g. from 140 to 170° C., and under conditions of mechanical stress such as experience by the rubber compound during kneading, milling or extrusion. Nitrosamines of some secondary amines are readily formed in the presence of NO (nitrogen oxide), and some nitrosamines of secondary amines have a high carcinogenic potential, so that their generation should be avoided, especially as a byproduct in polymer mixing processes, particularly when making tire formulations or at storage of amine-containing rubbers. The elastomeric polymers of the present invention, modified by means of one or more aminovinylsilane compounds, either do not form nitrosamines from released amines, or any such nitrosamines have proven not to be carcinogenic. As a result, the elastomeric polymers of the present invention can be handled in commercial applications according to the current state of the art.

DETAILED DESCRIPTION

Aminosilyl Monomer of Formula 1

In the aminosilyl monomers of Formula 1, it is generally preferred to control the steric bulk of the substituents, since it may have a direct impact on the polymerization kinetics. Hence, with regard to polymerization kinetics, monoaminovinylsilanes are preferred over diamino- or triamino-substituted silanes when considering identical amine substituents. As a result, it is preferred for the compounds of Formula 1 that y=1 and x=2 when polymerization kinetics are concerned. Still, it has been observed that polymer vulcanizates modified with diamino- or triaminovinylsilanes exhibit a better overall performance in terms of fuel consumption indicators at identical molar dosing amounts. As a result, when considering fuel consumption, it is preferred for the compounds of Formula 1 that y=2 and x=1 or y=3 and x=0.

Group R in Formula 1 is independently selected from $C_1$-$C_{30}$ hydrocarbyl. In particular, R is independently selected from methyl, ethyl and phenyl.

Group A is independently an amino group selected from Formulas 2 to 8 as defined above. In particular, A is independently selected from Formulas 3, 5, 6 and 7, more particularly from Formulas 5 and 7, and even more particularly A has a structure of Formula 7.

In Formulas 2 and 3, the $C_1$-$C_8$ alkyl group for $R^1$ and $R^2$ may be linear or, when $R^1$ or $R^3$ is $C_3$-$C_8$ alkyl, branched or cyclic. Examples of the $C_1$-$C_8$ alkyl group include methyl, ethyl, n-propyl, iso-propyl, n-butyl and hexyl, in particular methyl.

In Formula 3, the group —$CH_2$—O—$(CH_2)_{1-6}$—H for $R^2$ is preferably selected from —$CH_2$—O—$CH_3$ and —$CH_2$—O—$CH_2CH_3$. X is preferably selected from —O— and —$CH_2$—.

In Formula 5, the $C_8$-$C_{20}$ alkyl group for $R^3$ may be linear, branched or cyclic. Examples of the $C_8$-$C_{20}$ alkyl group include octyl, decyl, dodecyl, tetradecyl, hexadecyl, octadecyl and 2-ethylhexyl, in particular octyl, 2-ethylhexyl and octadecyl. In the group —$(CH_2)_2$—$Y_m$—$CH_3$ for $R^3$, m is preferably 3. An example of the group —$(CH_2)_2$—$Y_m$—$CH_3$ includes —$(CH_2)_2$—O—$(CH_2)_2$—O—$CH_2CH_3$.

In Formula 6, the $C_1$-$C_8$ alkyl group for $R^4$ may be linear or, when $R^4$ is $C_3$-$C_8$ alkyl, branched or cyclic. Examples of the $C_1$-$C_8$ alkyl group include methyl and ethyl, in particular methyl. $R^4$ is preferably selected from H and linear $C_1$-$C_8$ alkyl, more preferably from H and methyl.

In Formula 7, R' is preferably selected from methyl, ethyl, butyl and benzyl. $R^5$ is preferably selected from H and methyl.

In Formula 8, linear or branched $C_1$-$C_8$ alkyl for R" includes methyl, ethyl, propyl, isopropyl, n-butyl, isobutyl and hexyl, in particular methyl, ethyl and n-butyl.

Preferred examples of the aminosilyl monomers of Formula 1 include the following:
Monoaminovinylsilanes:

[Bis(6-methoxyhexylamino)](dimethyl)vinylsilane, 1-[dimethyl(vinyl)silyl]-4-methylpiperazine, 1-[dimethyl(vinyl)silyl]-4-ethylpiperazine, 1-[dimethyl(vinyl)silyl]-4-propyl-piperazine, 1-[dimethyl(vinyl)silyl]-4-butylpiperazine, 1-[dimethyl(vinyl)silyl]-4-hexyl-piperazine, 1-[dimethyl(vinyl)silyl]-4-benzylpiperazine, 1-[dimethyl(vinyl)silyl]-2,6-dimethyl-piperidine, (dibenzylamino)(dimethyl)vinylsilane, (dioctylamino)(dimethyl)vinylsilane, (didecylamino)(dimethyl)vinylsilane, (didodecylamino)(dimethyl)vinylsilane, (ditetradecyl-amino)(dimethyl)vinylsilane, (dihexadecylamino)(dimethyl)vinylsilane, (dioctadecyl-amino)(dimethyl)vinylsilane.
Diaminovinylsilanes:

[Bis(dibenzylamino)](dimethyl)vinylsilane, di(4-methylpiperazinyl)(methyl)vinylsilane, di(4-ethylpiperazinyl)(methyl)vinylsilane, di(4-propylpiperazinyl)(methyl)vinylsilane, di(butyl-piperazinyl)(methyl)vinylsilane.
Triaminovinylsilanes:

Tri(4-methylpiperazinyl)(methyl)vinylsilane, tri(4-ethylpiperazinyl)(methyl)vinylsilane, tri(4-butylpiperazinyl)(methyl)vinylsilane.

The manufacture (synthesis) of the aminosilyl monomers of Formula 1 constitutes part of the common general knowledge of the person skilled in the art, in this technical field. In addition, the skilled person may rely on the synthesis methods for vinylsilane compounds disclosed in WO 2015/055252, yet without using the silanol as a reactant.

Polymerization

The process for preparing the elastomeric polymer according to the first aspect of the present invention comprises polymerizing one or more conjugated diene monomers, one or more aminosilyl monomers of Formula 1 and optionally one or more aromatic monovinyl monomers in the presence of one or more initiator compounds. The elastomeric polymer can generally be prepared via anionic, radical or transition metal-catalyzed polymerization, but is preferably prepared by anionic polymerization. Two or more aminosilyl compounds of Formula 1 may be used in combination. The polymerization may be conducted in a solvent and may be carried out with one or more of chain end-modifying agents, coupling agents incl. modified coupling agents, randomizer compounds and polymerization accelerator compounds.

Further to the following specific disclosure, generally applicable directions on polymerization technologies including polymerization initiator compounds, polar coordinator compounds and accelerators (for increasing/changing the reactivity of the initiator, for randomly arranging aromatic vinyl monomers and/or for randomly arranging and/or changing the concentration of 1,2-polybutadiene or 1,2-polyisoprene or 3,4-polyisoprene units introduced in the polymer); the amounts of each compound; monomer(s); and suitable process conditions are described in WO 2009/148932, the content of which is incorporated herein by reference in its entirety.

Conjugated Dienes (Conjugated Diene Monomers)

Exemplary conjugated diene monomers useful in the present invention include 1,3-butadiene, 2-($C_1$-$C_5$ alkyl)-1,3-butadiene such as isoprene (2-methyl-1,3-butadiene), 2,3-dimethyl-1,3-butadiene, 1,3-pentadiene, 2,4-hexadiene, 1,3- hexadiene, 1,3-heptadiene, 1,3-octadiene, 2-methyl-2,4-pentadiene, cyclopentadiene, 2,4-hexadiene, 1,3-cyclooctadiene, β-myrcene, terpinene, α-farnesene. A mixture of two or more conjugated dienes may be used. Preferred conjugated dienes include 1,3-butadiene and isoprene. In one embodiment, the conjugated diene is 1,3-butadiene. The conjugated dienes may be used in a total amount of up to 99.99 wt. %, preferably 30 to 99.99 wt. %, based on the total weight of monomers used in the polymerization reaction.

Aromatic Monovinyl Monomers

The optional aromatic monovinyl monomers are compounds having only one vinyl group attached to an aromatic group. Exemplary aromatic vinyl monomers include styrene, $C_{1-4}$alkyl-substituted styrene such as 2-methylstyrene, 3-methylstyrene, 4-methylstyrene, 2,4-dimethylstyrene, 2,4,6-trimethylstyrene, α-methylstyrene, 2,4-diisopropylstyrene and 4-tert-butylstyrene, stilbene, vinyl benzyl dimethylamine, (4-vinylbenzyl)dimethyl aminoethyl ether, N,N-dimethylaminoethyl styrene, tert-butoxystyrene and vinylpyridine. Two or more aromatic monovinyl monomers may be used in combination. A preferred aromatic monovinyl monomer is styrene. The aromatic monovinyl monomer(s) may be used, depending on the application, in a total amount of up to 70 wt. %, especially 40-70 wt. % or 0-40 wt. %, for example 15-40 wt. % or 2-15 wt. %, based on the total weight of monomers used in the polymerization reaction.

Other Monomers

Comonomers other than the aminosilyl monomer of Formula 1, the conjugated diene monomer and the aromatic vinyl monomer, which may be used in preparing the elastomeric polymer of the invention, include acrylic monomers such as acrylonitrile, acrylates, e.g., acrylic acid, methyl acrylate, ethyl acrylate, propyl acrylate and butyl acrylate, and methacrylates, e.g., methyl methacrylate, ethyl methacrylate, propyl methacrylate and butyl methacrylate.

Comonomers also include aromatic di- or higher vinyl compounds which have two or more vinyl groups attached to an aromatic group, such as divinylbenzene, including 1,2-divinylbenzene, 1,3-divinylbenzene and 1,4-divinylbenzene. They may be used in total amounts of 1 wt. % or less (based on the total molar weight of the monomers used to make the polymer). In one preferred embodiment, 1,2-divinylbenzene is used in combination with styrene and butadiene or isoprene.

Initiator Compounds

An initiator compound is used in the polymerization process of the present invention, and two or more initiator compounds may be used in combination. The initiator compound may be a monovalent or multivalent (divalent, trivalent, etc.) initiator compound, including dianionic initiators. Suitable initiator compounds include alkali metals, organoalkali metal compounds, a complex between an alkali metal and a polar compound, an oligomer containing an alkali metal, and Lewis acid-base complexes. Exemplary alkali metals include lithium, sodium, potassium, rubidium and cesium. Exemplary organoalkali metal compounds include ethyllithium, n-butyllithium, s-butyllithium, t-octyllithium, isopropyllithium, phenyllithium, cyclohexyllithium, 2-butyllithium, 4-phenylbutyllithium, t-butyldimethylsilyloxypropyllithium, dialkylaminopropyllithium, N-morpholinopropyllithium, lithiumdiisopropylamide, lithium piperidide, lithium pyrrolidide, dilithiated diphenylethylene compounds, multi-lithiated trivinyl benzene compounds, sodium biphenylide, sodium naphthalenide and potassium naphthalenide. Exemplary complexes between an alkali metal and a polar compound include a lithium-tetramethylethylenediamine complex, a lithium-tetrahydrofuran complex, a lithium-ditetrahydrofuranepropane complex, and the sodium and potassium analogues thereof. More preferably, the initiator compound is a mono- or dilithium alkyl, alkylaryl or aryl compound. Further useful initiators include the amino silane polymerization initiators described in WO 2014/040640 (incorporated herein by reference in its entirety) and the polymerization initiators described in WO 2015/010710 (incorporated herein by reference in its entirety). The total amount of the initiator(s), in particular the organolithium initiator(s), will be adjusted depending on the monomer and target molecular weight. The total amount is typically from 0.05 to 5 mmol, preferably from 0.2 to 3 mmol per 100 grams of monomer.

Solvent

The polymerization is usually conducted as a solution polymerization, wherein the formed polymer is substantially soluble in the reaction mixture, or as a suspension/slurry polymerization, wherein the formed polymer is substantially insoluble in the reaction medium. The terms "solution polymerization" and "suspension polymerization" or "slurry polymerization" are use with their conventional meaning in the art of polymerization. More preferably, the polymer is obtained in a solution polymerization. As the polymerization solvent, a hydrocarbon solvent is conventionally used which does not deactivate the initiator, catalyst or active polymer chain. A combination of two or more solvents may be used. Exemplary hydrocarbon solvents include aliphatic and aromatic solvents. Specific examples include (including all conceivable constitutional isomers): propane, butane, pentane, hexane, heptane, butene, propene, pentene, hexane, octane, benzene, toluene, ethylbenzene and xylene.

Chain End-Modifying Agents

One or more chain end-modifying agents may be used in the polymerization reaction of the present invention for further controlling polymer properties by reacting with the terminal ends of the polymer chains in the polymer of the invention. Generally, silane-sulfide omega chain end-modifying agents such as disclosed in WO 2007/047943, WO 2009/148932, U.S. Pat. No. 6,229,036 and US 2013/0131263, each incorporated herein by reference in its entirety, can be used for this purpose. Other chain end-modifying agents suitable for use in the present invention are those disclosed in WO 2014/040640 and WO 2015/010710 and the silane sulfide modifiers described in WO 2014/040639, each incorporated herein by reference in its entirety.

The chain end-modifying agents may be added intermittently (at regular or irregular intervals) or continuously during the polymerization, but are preferably added at a conversion rate of the polymerization of more than 80 percent and more preferably at a conversion rate of more than 90 percent. Preferably, a substantial amount of the polymer chain ends is not terminated prior to the reaction with the chain end-modifying agent; that is, living polymer chain ends are present and are capable of reacting with the modifying agent.

Coupling Agents

For further controlling polymer molecular weight and polymer properties, a coupling agent ("linking agent") can be used as an optional component in the process of the invention. A coupling agent will reduce hysteresis loss by reducing the number of free chain ends of the elastomeric polymer and/or reduce the polymer solution viscosity, compared with non-coupled essentially linear polymer macromolecules of identical molecular weight. Coupling agents such as tin tetrachloride and tetramethoxy silane may functionalize the polymer chain end and react with components of an elastomeric composition, for example with a filler or with unsaturated portions of a polymer. Exemplary coupling agents are described in U.S. Pat. Nos. 3,281,383, 3,244,664 and 3,692,874 (e.g., tetrachlorosilane); U.S. Pat. Nos. 3,978,103, 4,048,206, 4,474,908 and 6,777,569 (blocked mercaptosilanes); U.S. Pat. No. 3,078,254 (multi-halogen-substituted hydrocarbon, such as 1,3,5-tri(bromo methyl) benzene); U.S. Pat. No. 4,616,069 (tin compound and organic amino or amine compound); and U.S. 2005/0124740. Generally, the chain end-modifying agent is added before, during or after the addition of the coupling agent, and the modification reaction is preferably carried out after the addition of the coupling agent. The total amount of coupling agents used will influence the Mooney viscosity of the coupled polymer and is typically in the range of from 0.001 to 4.5 milliequivalents per 100 grams of the elastomeric polymer, for example 0.01 to about 1.5 milliequivalents per 100 grams of polymer.

Randomizer Compounds

Randomizer compounds as conventionally known in the art (also known as polar coordinator compounds) may optionally be added to the monomer mixture or polymerization reaction, in order to adjust the microstructure (i.e. the content of vinyl bonds) of the conjugated diene part of the polymer, or to adjust the composition distribution of any aromatic vinyl monomer and of the vinyl bonds in the polymer chain. A combination of two or more randomizer compounds may be used. Randomizer compounds useful in the invention are generally exemplified by Lewis base compounds. Suitable Lewis bases for use in the present invention are, for example, ether compounds such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, ($C_1$-$C_8$ alkyl)tetrahydrofurylethers (including methyltetrahydrofurylether, ethyltetrahydrofurylether, propyltetrahydrofurylether, butyltetrahydrofurylether, hexyltetrahydrofurylether and octyltetrahydrofurylether), tetrahydrofuran, 2,2-(bistetrahydrofurfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene and dimethoxyethane, and tertiary amines such as triethylamine, pyridine, N,N,N',N'-tetramethyl ethylenediamine, dipiperidinoethane, methyl ether of N,N-diethylethanolamine, ethyl ether of N,N-diethylethanolamine, N,N-diethylethanolamine and dimethyl N,N-tetrahydrofurfuryl amine. Examples of preferred randomizer compounds are identified in WO 2009/148932, incorporated herein by reference in its entirety. The randomizer compound will typically be added at a molar ratio of randomizer compound to initiator compound of from 0.012:1 to 10:1, preferably from 0.1:1 to 8:1 and more preferably from 0.25:1 to about 6:1.

Accelerator Compounds

The polymerization can optionally include accelerators to increase the reactivity of the initiator (and, thus, to increase the polymerization rate), to randomly arrange aromatic vinyl monomers introduced into the polymer, or to provide a single chain of aromatic vinyl monomers, thus influencing the distribution of aromatic vinyl monomers in a living anionic elastomeric copolymer. Examples of accelerators include sodium alkoxides or sodium phenoxides and potassium alkoxides or potassium phenoxides, preferably potassium alkoxides or potassium phenoxides, such as potassium isopropoxide, potassium t-butoxide, potassium t-amyloxide, potassium n-heptyloxide, potassium benzyloxide, potassium phenoxide; potassium salts of carboxylic acids, such as isovaleric acid, caprylic acid, lauric acid, palmitic acid, stearic acid, oleic acid, linolenic acid, benzoic acid, phthalic acid and 2-ethyl hexanoic acid; potassium salts of organic sulfonic acids, such as dodecyl benzenesulfonic acid, tetradecyl benzenesulfonic acid, hexadecyl benzenesulfonic acid and octadecyl benzenesulfonic acid; and potassium salts of organic phosphorous acids, such as diethyl phosphite, diisopropyl phosphite, diphenyl phosphite, dibutyl phosphite, and dilauryl phosphite. Such accelerator compounds may be added in a total amount of from 0.005 to 0.5 mol per 1.0 gram atom equivalent of initiator. If less than 0.005 mol is added, a sufficient effect is not typically achieved. On the other hand, if the amount of the accelerator compound is more than about 0.5 mol, the productivity and efficiency of the chain end modification reaction can be significantly reduced.

Dosing

The aminosilyl monomer of Formula 1 can be used in a total amount of from 0.5 equivalents per equivalent of initiator compound(s) to 100 equivalents per equivalent of initiator, preferably 1.25 to 10 equivalents per equivalent of initiator, more preferably 1.5 to 10, or 2 to 10 or 2 to 5 equivalents per equivalent of initiator. The remaining amount of the elastomeric polymer is derived from conjugated diene monomer(s) and optional aromatic monovinyl monomer(s) as well as further optional components, including other monomer(s), chain end-modifying agent(s), coupling agent(s) and randomizer(s).

The mode of addition ("dosing") of the aminosilyl monomer of Formula 1 in the polymerization process relative to conjugated diene monomer and optional aromatic monovinyl monomer, initiator compound and other components will affect the structure of the resulting polymer. Thus, statistical copolymers and block copolymers having blocks of vinylsilane polymer and blocks of other monomers in desired proportions and sequences can be prepared.

Polymer

The elastomeric polymer according to the second aspect of the invention is obtainable, or obtained, by the process of the present invention, namely by polymerizing monomers comprising one or more conjugated diene monomers, one or more aminosilyl monomers of Formula 1 and optionally one or more aromatic monovinyl monomers in the presence of one or more initiator compounds. The polymer of the invention may be a statistical, block or tapered copolymer, or an alpha- or alpha, omega-modified polymer where the aminosilyl monomer of Formula 1 is incorporated in the polymer chain by means of its vinyl function. The polymer may be linear or branched.

In preferred embodiments, the polymer of the invention is an SSBR (solution styrene butadiene rubber) with a preferred vinyl content of 5-80%, more preferred 30-75%, most preferred 40-70% (depending on the specific application), a styrene content (depending on the specific application) of 40-70 wt. %, or 15-40 wt. %, or 2-15 wt. %; a PBR (polybutadiene rubber) with a vinyl content of <15%; or 15-40%, or 40-80%; a PIR (polyisoprene rubber); an SSIR (solution styrene isoprene rubber); or an SSIBR (solution styrene isoprene butadiene rubber); more preferably an SSBR or PBR; even more preferably an SSBR, each being modified by incorporation of the aminosilyl monomer of Formula 1. In case of an SSBR, the elastomeric polymer is characterized by a glass transition temperature (Tg, determined by DSC) of −90 to 0° C., preferably −80 to −5° C., more preferably −70 to −10° C. The most preferred Tg for truck tire applications is −70 to −40° C., and the most preferred Tg for passenger car tire applications is −40 to −10° C. In preferred embodiments, the polymer of the invention has a peak molecular weight (measured by GPC) from: 800 to 10,000 g/mol or 10,000 to 50,000 g/mol or 50,000 to 120,000 g/mol or 120,000 to 250,000 g/mol or 250,000 to 400,000 g/mol or 400,000 to 800,000 g/mol.

Non-Vulcanized (Non-Cured) Polymer Composition

The non-vulcanized polymer composition of the third aspect of the present invention comprises the elastomeric polymer of the invention and one or more further components selected from (i) components which are added to or formed as a result of the polymerization process used for making said polymer, (ii) components which remain after solvent removal from the polymerization process and (iii) components which are added to the polymer after completion of the polymer manufacturing process. In particular, such components (i) and (iii) can be one or more components selected from oils (extender oils), fillers, stabilizers and further polymers, including polymer oils (Mp (real)=800 to 50,000 g/mol measured by GPC) (which are not the polymers of the invention). Such further polymers include what is conventionally referred to as oligomers in this field. In one embodiment, the polymer composition additionally comprises one or more vulcanizing agents.

In one embodiment, the non-vulcanized (uncrosslinked or non-cured) polymer composition is obtained by conventional work-up of the reaction mixture obtained in the polymerization process. Work-up means the removal of the solvent using steam stripping or vacuum evaporation techniques.

In another embodiment, the non-vulcanized polymer composition of the invention is obtained as a result of a further mechanical mixing process involving the worked-up reaction mixture (including the polymer of the invention), preferably in the form of a rubber bale (i.e. the product of a conventional compounding process in an internal mixer and/or by means of a two-roll mill), and at least one filler.

The following components are conventionally added in non-vulcanized compositions used in tires: Extender oils, stabilizers, fillers, further polymers including polymer oils (Mp (real)=800 to 50,000 g/mol measured by GPC).

(Extender) Oils

In one embodiment, the polymer composition of the present invention comprises the elastomeric polymer of the invention in combination with one or more oils, especially mineral oils. For representative examples and classification of oils see WO 2009/148932 and US 2005/0159513, each of which is incorporated herein by reference in its entirety. Such oils include, for instance, conventionally known extender oils such as aromatic, naphthenic and paraffinic extender oils, for example MES (mild extraction solvate), TDAE (treated distillate aromatic extract), rubber-to-liquid (RTL) oils, biomass-to-liquid (BTL) oils, factices, extender resins or liquid polymers (such as liquid BR) having a median molecular weight (determined via GPC according to BS ISO 11344:2004) of from 800 to 50,000 g/mol. When using a mineral oil as the extender oil, it is preferably one or more selected from DAE (Distillated Aromatic Extracts), RAE (Residual Aromatic Extract), TDAE, MES and naphthenic oils. The aforementioned oils comprise different concentrations of polycyclic aromatic compounds, paraffinics, naphthenics and aromatics, and have different glass transition temperatures. The above mentioned types of oil have been characterized in "Kautschuk, Gummi, Kunststoffe", vol. 52, pages 799-805. In some embodiments, MES, RAE and TDAE are preferred extender oils for rubber.

The one or more oils can be added to the polymer prior to or after the termination of the polymerization process. When the extender oil is added to the polymer solution, the timing of addition should preferably be after modification of the polymer or termination of the polymerization, for example after the addition of the modifying agent or polymerization termination agent. After the addition of extender oil, the oil-extended polymer composition can be obtained by separating any polymerization solvent from the polymer by means of a direct drying method or steam stripping, drying the rubber using a vacuum dryer, hot-air dryer, roller and the like.

The polymer composition may contain one or more oils in a total amount of from 0 to 70 phr, preferably 0.1 to 60 phr, more preferably 0.1 to 50 phr. When liquid polymers are used as extender oils in the polymer composition of the present invention, they are not taken into account when calculating the composition of the polymer matrix.

In another embodiment, the oil is added to the "solvent-free" polymer in a mechanical mixer together with preferably at least one filler, and at least one further polymer.

Fillers

The polymer composition of the invention, which optionally comprises one or more extender oils as defined above, may further comprise one or more fillers. Filler can be added to the polymer prior to or after the termination of the polymerization process. Examples of suitable fillers include carbon black (including electroconductive carbon black), carbon nanotubes (CNT) (including discrete CNT, hollow carbon fibers (HCF) and modified CNT carrying one or more functional groups, such as hydroxyl, carboxyl and carbonyl groups), graphite, graphene (including discrete graphene platelets), silica, carbon-silica dual-phase filler, clays (layered silicates, including exfoliated nanoclay and organoclay), calcium carbonate, magnesium carbonate, magnesium oxide, titanium dioxide, rubber gels, lignin, amorphous fillers, such as glass particle-based fillers, starch-based fillers, and combinations thereof. Further examples of suitable fillers are described in WO 2009/148932, which is fully incorporated herein by reference.

Any type of carbon black conventionally known to a person of skill in the art may be used. In one embodiment, the carbon black has an iodine number according to ASTM D 1510 of 20 to 250 mg/g, preferably 30 to 180 mg/g, more preferably 40 to 180 mg/g, and even more preferably 40 to 130 mg/g, and a DBP number according to ASTM D 2414 of 80 to 200 ml/100 g, preferably 100 to 200 ml/100 g, more preferably 115 to 200 ml/100 g (the DBP number determines the specific absorption volume of carbon black or of any bright filler by means of dibutyl phthalate).

Any type of silica conventionally known to a person of skill in the art and suitable as filler for tire rubber blends may be used. It is particularly preferred to use highly dispersed, precipitated silica having an nitrogen surface area (BET surface area; according to DIN ISO 9277 and DIN 66132) of 35 to 350 $m^2/g$, preferably 35 to 260 $m^2/g$, more preferably 100 to 260 $m^2/g$ and even more preferably 130 to 235 $m^2/g$, and having a CTAB surface area (according to ASTM D 3765) of 30 to 400 $m^2/g$, preferably 30 to 250 $m^2/g$, more preferably 100 to 250 $m^2/g$ and even more preferably 125 to 230 $m^2/g$. Such silica results, e.g. in rubber blends for tire treads, in particularly beneficial physical properties of the vulcanizates. In addition, it may bring about advantages in the processing of the blend, namely by reducing the time required for blending, while maintaining product properties, thus improving productivity. Useful silicas include those of the type Ultrasil® VN3 (trademark of Evonik Industries) as well as highly dispersed types, so-called HD silicas (e.g. Zeosil® 1165 MP of Rhodia).

Stabilizers

One or more stabilizers ("antioxidants") can optionally be added to the polymer prior to or after the termination of the polymerization process to prevent the degradation of the elastomeric polymer by molecular oxygen. Antioxidants based on sterically hindered phenols, such as 2,6-di-tert-butyl-4-methylphenol, 6,6'-methylenebis(2-tert-butyl-4-methylphenol), Iso-octyl-3-(3,5-di-tert-butyl-4-hydroxyphenyl) propionate, hexamethylene-bis[3-(3,5-di-tert-butyl-4-hydroxyphenyl)propionate], octadecyl-3-(3,5-di-tert-butyl-4-hydroxyphenyl) propionate, isotridecyl-3-(3,5-di-tert-butyl-4-hydroxyphenyl) propionate, 1,3,5-tri methyl-2,4,6-tris(3,5-di-tert-butyl-4-hydroxybenzyl) benzene, 2,2'-ethylidenebis-(4,6-di-tert-butylphenol), tetrakis[methylene-3-(3,5-di-tert-butyl-4-hydroxyphenyl)propionate]methane, 2-[1-(2-hydroxy-3, 5-di-tert-pentylphenyl)ethyl]-4, 6-di-tert-pentylphenyl acrylate and 2-tert-butyl-6-(3-tert-butyl-2-hydroxy-5-methylbenzyl)-4-methylphenyl acrylate, and antioxidants based on thio-esters, such as 4,6-bis(octylthiomethyl)-o-cresol and pentaerythrityl tetrakis(3-laurylthiopropionate), are typically used. Further examples of suitable stabilizers can be found in F. Röthemeyer, F. Sommer, Kautschuk Technologie, $2^{nd}$ ed., (Hanser Verlag, 2006) pages 340-344, and references cited therein.

Silane Coupling Agents

In some embodiments, a silane coupling agent (used for compatibilization of polymer and fillers) can be added to a polymer composition of the invention when additionally containing one or more of silica, layered silicate (such as magadiite) and carbon-silica dual-phase filler. The typical amount of a silane coupling agent added is from about 1 to about 20 parts by weight and, in some embodiments, from about 5 to about 15 parts by weight for 100 parts by weight of the total amount of silica and/or carbon-silica dual-phase filler.

Silane coupling agents can be classified according to Fritz Rothemeyer, Franz Sommer: Kautschuk Technologie, (Carl Hanser Verlag 2006):

(A) bifunctionalized silanes, including Si230 ($(EtO)_3Si(CH_2)_3Cl$), Si225 ($(EtO)_3SiCH=CH_2$), Si263 ($(EtO)_3Si(CH_2)_3SH$), [$(EtO)_3Si(CH_2)_3S_x(CH_2)_3Si(OEt)_3$] with x=3.75 (Si69), 2.35 (Si75) or 2.15 (Si266), Si264 ($(EtO)_3Si—(CH_2)_3SCN$) and Si363 ($(EtO)Si((CH_2—CH_2—O)_5(CH_2)_{12}CH_3)_2(CH_2)_3SH)$) (Evonic Industries AG); NXT (3-octanoylthio-1-propyltriethoxysilane), NXT-Z45, NXT-Z100 (Momentive Performance Materials Inc.); Xiameter® ofs-6030 silane (methacryloxypropyltrimethoxysilane), Xiameter® ofs-6300 silane (($MeO)_3SiCH=CH_2$), and (B) monofunctional silanes, including Si203 ($(EtO)_3—Si—C_3H_7$), Si208 ($(EtO)_3—Si—C_8H_{17}$) and Si216 ($(EtO)_3—Si—C_{16}H_{33}$)).

Further suitable examples of silane coupling agents are given in WO 2009/148932 and include bis-(3-hydroxy-dimethylsilyl-propyl)tetrasulfide, bis-(3-hydroxy-dimethylsilyl-propyl) disulfide, bis-(2-hydroxy-dimethylsilyl-ethyl) tetrasulfide, bis-(2-hydroxy-dimethylsilyl-ethyl)disulfide, 3-hydroxy-dimethylsilyl-propyl-N,N-dimethylthiocarbamoyl tetrasulfide and 3-hydroxy-dimethylsilyl-propylbenzothiazole tetrasulfide.

Further Polymers

Apart from polymer of the invention, extender oil(s), filler(s), etc., the polymer composition of the invention may additionally contain further polymer, especially further elastomeric polymer. Further polymers may be added in the form of a solution to a solution of the polymer of the invention prior to work up of the polymer blend or may be added during a mechanical mixing process, e.g. in a Brabender mixer.

Further (elastomeric) polymers as referred to herein are elastomeric polymers which are not in accordance with the polymer of the invention, i.e. which do not contain repeating units derived from the aminosilyl monomer of Formula 1. Such further polymers include what is conventionally referred to as oligomers in this field.

Vulcanizing Agents and Vulcanizing Accelerators

The polymer composition of the invention may optionally further comprise one or more vulcanizing agents. Any vulcanizing agent conventionally used in the manufacture of rubber products can be used in the invention, and a combination of two or more vulcanizing agents may be used.

Sulfur, sulfur-containing compounds acting as sulfur donors such as dithiols, sulfur accelerator systems and peroxides are the most common vulcanizing agents. Examples of sulfur-containing compounds acting as sulfur donors include dithiodimorpholine (DTDM), tetramethylthiuram disulfide (TMTD), tetraethyl thiuram disulfide (TETD) and dipentamethylene thiuram tetrasulfide (DPTT). Examples of sulfur accelerators include amine derivates, guanidine derivates, aldehydeamine condensation products, thiazoles, xanthogenates, thiuram sulfides, dithiocarbamates and thiophosphates. It is preferably to use one or more sulfonamide accelerators selected from N-cyclohexyl 2-benzothiazol sulfenamide (CBS), N,N-dicyclohexyl benzothiazole 2-sulfenamide (DCBS), benzothiazyl 2-sulfenemorpholide (MBS) and N-tert-butyl 2-benzothiazyl sulfenamide (TBBS). Further crosslinking systems such as available under the trade names Vulkuren® (1,6-bis(N,N-dibenzyl thiocarbamoyldithio)-hexane; Lanxess), Duralink® or Perkalink® (1,3-bis(citraconimidomethyl)benzene; Lanxess) or disclosed in WO 2010/049261 may be added to the polymer composition. Examples of peroxides include di-tert-butyl-peroxides, di-(tert-butyl-peroxy-trimethyl-cyclohexane), di-(tert-butyl-peroxy-isopropyl-)benzene, dichloro-benzoylperoxide, dicumylperoxides, tert-butyl-cumyl-peroxide, dimethyl-di(tert-butyl-peroxy)hexane, dimethyl-di(ter-butyl-peroxy)hexine and butyl-di(tert-butyl-peroxy)valerate (*Rubber Handbook, SGF, The Swedish Institution of Rubber Technolgy* 2000).

A vulcanizing accelerator of the sulfene amide-type, guanidine-type or thiuram-type can be used together with a vulcanizing agent as required.

In addition, the polymer composition of the invention may contain conventional additives and vulcanization auxiliaries in proportions conventionally used. Such additives include:

a) aging inhibitors such as N-phenyl N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl N'-phenyl-p-phenylenediamine (IPPD), 2,2,4-trimethyl 1,2-dihydrochinolin (TMQ), b) activators such as zinc oxide and fatty acids (e.g. stearic acid), c) waxes, d) resins, especially adhesive resins, e) mastication additives such as 2,2'-dibenzamidodiphenyldisulfide (DBD) and f) processing additives such as zinc soaps and fatty acid esters and their derivatives.

Zinc oxide (zinc white) is preferably used as a component of the sulfur accelerator system.

Vulcanizing agents are typically added to the polymer composition in a total amount of from 0.5 to 10 parts by weight or, in some embodiments, 1 to 6 parts by weight per 100 parts by weight of the polymer. Examples of vulcanizing accelerators and amounts thereof relative to the polymer are given in WO 2009/148932, which is incorporated herein by reference in its entirety.

Vulcanized Polymer Composition and Method of Making the Same

The vulcanized polymer composition of the fourth aspect of the invention is obtained by vulcanizing a polymer composition of the invention comprising one or more vulcanizing agents, under conditions and with machinery conventionally known in the art.

Article Comprising Vulcanized Polymer Composition

Since the vulcanized polymer compositions of the invention exhibit low rolling resistance, low dynamic heat build-up and increased wet grip, they are well suited for use in manufacturing, e.g., tires or parts of tires including for example: tire treads, side walls and tire carcasses as well as other industrial products such as belts, hoses, vibration dampers and footwear components. Thus, the article of the sixth aspect of the present invention comprises at least one component formed from the vulcanized polymer composition of the invention. The article may be, for instance, a tire, including parts thereof such as a tire tread, a tire side wall and a tire carcass, a belt, a gasket, a seal, a hose, a vibration damper, a golf ball or a footwear component, such as a shoe sole.

Definitions

Alkyl groups as used herein and unless specifically defined otherwise, whether as such or in association with other groups, such as alkylaryl or alkoxy, include both straight chain alkyl groups, such as methyl (Me), ethyl (Et), n-propyl (Pr), n-butyl (Bu), n-pentyl, n-hexyl, octyl (oct) etc., branched alkyl groups, such as isopropyl, tert-butyl, etc., and cyclic alkyl groups, such as cyclohexyl.

Aryl groups as used herein include phenyl, biphenyl and other benzenoid compounds.

Aryl groups preferably contain only one aromatic ring and most preferably contain a $C_6$ aromatic ring.

Alkylaryl groups as used herein refer to a combination of one or more aryl groups bound to one or more alkyl groups, for example in the form of alkyl-aryl, aryl-alkyl, alkyl-aryl-alkyl and aryl-alkyl-aryl. Alkylaryl groups preferably contain only one aromatic ring and most preferably contain a $C_6$ aromatic ring.

The present invention will be explained in more detail by way of examples, which are not intended to be limiting the present invention.

EXAMPLES

1) Preparation and Characterization of Aminosilyl Monomers

Modifier 1g: Diethylaminodimethylvinylsilane; 1h: Bis(diethylamino)methylvinylsilane 1-[Dimethyl(vinyl)silyl]-4-methylpiperazine (1j)

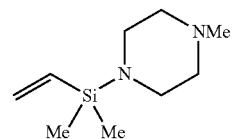

1j

Chlorodimethylvingylsilane (12.1 g, 100 mmol, 1.0 equiv.) was added dropwise to a solution of methylpiperazine (11.0 g, 110 mmol, 1.1 equiv.) and LiH (0.95 g, 120 mmol, 1.2 equiv.) in MTBE (80 ml) at ambient temperature. The mixture was stirred for 18 h at ambient temperature. After filtration the solvent was removed under reduced pressure and distillation at 40 mbar furnished 1j (14.1 g, 76.5 mmol, 76%) as a colorless oil (bp 55-57° C. (0.2 mbar)). $C_9H_{20}N_2Si$, $M_w=184.36$ g mol$^{-1}$ $^1$H NMR (400 MHz, 20° C., $C_6D_6$): δ=6.12 (dd, J=20.2 Hz, J=14.7 Hz, 1 H), 5.93 (dd, J=14.7 Hz, J=4.1 Hz, 1H), 5.71 (dd, J=20.2 Hz, J=4.1 Hz, 1H), 2.88 (t, J=4.8 Hz, 4H), 2.14-2.11 (m, 4H), 2.11 (s, 3H), 0.10 (s, 6H) ppm. $^{13}$C NMR (101 MHz, 20° C., $C_6D_6$): δ=139.28 (CH, vinyl), 132.20 (CH$_2$, vinyl), 57.22 (2 CH$_2$), 47.00 (CH$_3$), 45.67 (2 CH$_2$), −2.32 (2 CH$_3$) ppm. GC-MS (EI, 70 eV): m/z (%)=184 (M$^+$, 100), 169 (M$^+$ —CH$_3$, 24), 155 (5), 140 (22), 114 (28), 85 ($C_4H_9Si^+$, 42).

Di(4-methylpiperazinyl)(methyl)vinylsilane (1k)

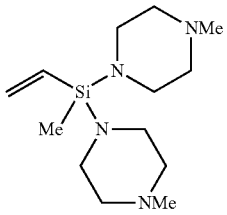

Methylpiperazine (10.9 g, 109 mmol, 2.2 equiv.) was added dropwise to a solution of dichloromethylvinylsilane (7.00 g, 49.6 mmol, 1.0 equiv.) and triethylamine (12.5 g, 124 mmol, 2.5 equiv.) in DCM (90 ml) at ambient temperature. The mixture was stirred for 16 h. After addition of hexanes (60 ml) and filtration the solvent was removed under reduced pressure. Distillation at reduced pressure furnished 1k (12.1 g, 45.0 mmol, 91%) as a colorless oil (bp 135-136° C. (8 mbar)). $C_{13}H_{28}N_4Si$, $M_w$=268.48 g mol$^{-1}$ $^1$H NMR (400 MHz, 20° C., $C_6D_6$): δ=6.11 (dd, J=20.0 Hz, J=14.4 Hz, 1H), 5.96 (dd, J=14.8 Hz, J=4.4 Hz, 1H), 5.79 (dd, J=20.0 Hz, J=4.4 Hz, 1H), 2.97 (t, J=4.4 Hz, 8H), 2.17-2.12 (m, br, 8H), 2.13 (s, 6H), 0.12 (s, 3H) ppm. $^{13}$C NMR (101 MHz, 20° C., $C_6D_6$): δ=137.29 (CH, vinyl), 133.18 (CH$_2$, vinyl), 57.26 (4 CH$_2$), 47.03 (2 CH$_3$), 45.41 (4 CH$_2$), −3.97 (CH$_3$) ppm. GC-MS (EI, 70 eV): m/z (%)=268 (M$^+$, 0.7), 169 (M$^+$ —C$_5$H$_{11}$N$_2$, 100), 126 (7), 98 (14), 71 (C$_3$H$_7$Si$^+$, 18). IR (ATR, cm$^{-1}$): 2934 (m), 2831 (m), 2741 (m), 2732 (w), 2687 (w), 1447 (m), 1371 (m), 1285 (s), 1149 (s), 1098 (s), 1066 (m), 1005 (s), 970 (vs), 920 (m), 778 (vs), 734 (s).

Tri(4-methylpiperazinyl)vinylsilane (1l)

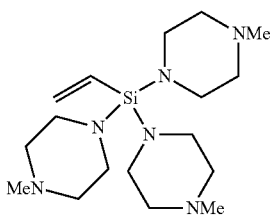

Methlpiperazine (9.95 g, 99.3 mmol, 3.5 equiv.) was added dropwise to a solution of trichlorovinylsilane (4.58 g, 28.4 mmol, 1.0 equiv.) and triethylamine (10.0 g, 99.3 mmol, 3.5 equiv.) in DCM (60 ml) at ambient temperature. The mixture was stirred for 5 h. After addition of hexanes (60 ml) and filtration the solvent was removed under reduced pressure. Distillation at reduced pressure furnished 1l (7.73 g, 21.9 mmol, 77%) as a colorless oil (bp 185° C. (1.4 mbar)). $C_{17}H_{36}N_6Si$, $M_w$=352.60 g mol$^{-1}$ $^1$H NMR (400 MHz, 20° C., $C_6D_6$): δ=6.13-5.85 (m, 3H), 3.02-2.99 (m, 12H), 2.17 (s, br 12H), 2.14 (s, 3H) ppm. $^{13}$C NMR (101 MHz, 20° C., $C_6D_6$): δ=134.11 (CH, vinyl), 133.25 (CH$_2$, vinyl), 57.22 (6 CH$_2$), 47.07 (3 CH$_3$), 45.40 (6 CH$_2$) ppm. GC-MS (EI, 70 eV): m/z (%)=352 (M$^+$, 0.7), 325 (M$^+$ —C$_2$H$_3$, 2), 255 (79), 253 (M$^+$ —C$_6$H$_{11}$N$_2$, 74), 198 (5), 155 (M$^+$ —C$_{10}$H$_{21}$N$_4$, 100), 98 (C$_6$H$_{10}$N$_2^+$, 27). IR (ATR, cm$^{-1}$): 2934 (w), 2823 (m), 2780 (m), 2732 (w), 1457 (m), 1370 (m), 1285 (m), 1150 (s), 1098 (s), 1066 (m), 1003 (s), 961 (vs), 916 (m), 715 (m).

1-[Dimethyl(vinyl)silyl]-4-benzylpiperazine (1m)

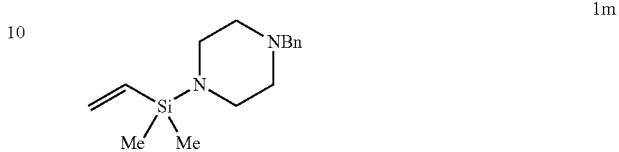

Benzylpiperazine (11.3 g, 63.8 mmol, 1.1 equiv.) was added dropwise to a solution of chlorodimethylvinylsilane (7.00 g, 58.0 mmol, 1.0 equiv.) and triethylamine (7.04 g, 69.6 mmol, 1.2 equiv.) in DCM (70 ml) at ambient temperature. The mixture was stirred for 18 h. After addition of hexanes (60 ml) and filtration the solvent was removed under reduced pressure. Distillation at reduced pressure provided 1m (11.4 g, 43.9 mmol, 76%) as a colorless oil (bp 151-153° C. (9 mbar)). $C_{16}H_{24}N_2Si$, $M_w$=260.45 g mol$^{-1}$ $^1$H NMR (400 MHz, 20° C., $C_6D_6$): δ=7.36-7.34 (m, 2H), 7.21-7.08 (m, 3H), 6.12 (dd, J=20.0 Hz, J=14.8 Hz, 1H), 5.93 (dd, J=14.8 Hz, J=4.0 Hz, 1H), 5.71 (dd, J=20.0 Hz, J=4.0 Hz, 1H), 3.33 (s, 2H), 2.86 (t, J=4.8 Hz, 4H), 2.14-2.11 (m, 4H), 0.10 (s, 6H) ppm. $^{13}$C NMR (101 MHz, 20° C., $C_6D_6$): δ=139.28 (C, Ph), 139.22 (CH, vinyl), 132.21 (CH$_2$, vinyl), 129.34 (2 CH, Ph), 128.47 (2 CH, Ph), 127.19 (CH, Ph), 64.10 (CH$_2$), 55.47 (2 CH$_2$), 45.71 (2 CH$_2$), −2.38 (2 CH$_3$) ppm. GC-MS (EI, 70 eV): m/z (%)=260 (M$^+$, 66), 245 (M$^+$ —CH$_3$, 8), 219 (11), 169 (M$^+$ —C$_7$H$_7^+$, 50), 113 (78), 91 (C$_7$H$_7^+$, 100). IR (ATR, cm$^{-1}$): 3027 (w), 2941 (w), 2801 (m), 2758 (w), 1495 (w), 1453 (w), 1252 (m), 1130 (m), 1029 (m), 1007 (m), 959 (s), 816 (s), 772 (s), 734 (s), 696 (vs).

1-[Dimethyl(vinyl)silyl]-4-ethylpiperazine (1n)

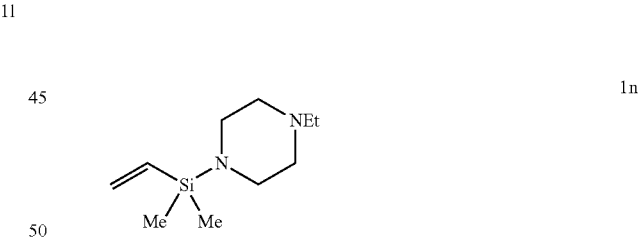

Ethylpiperazine (7.95 g, 69.6 mmol, 1.2 equiv.) was added dropwise to a solution of chlorodimethylvinylsilane (7.00 g, 58.0 mmol, 1.0 equiv.) and triethylamine (7.04 g, 69.6 mmol, 1.2 equiv.) in DCM (70 ml) at ambient temperature. The mixture was stirred for 3 d at this temperature. After addition of hexanes (60 ml) and filtration the solvent was removed under reduced pressure. Distillation at reduced pressure provided 1n (9.40 g, 47.4 mmol, 82%) as a colorless oil (bp 73-75° C. (10 mbar)). $C_{10}H_{22}N_2Si$, $M_w$=198.38 g mol$^{-1}$ $^1$H NMR (400 MHz, 20° C., $C_6D_6$): δ=6.14 (dd, J=20.4 Hz, J=14.8 Hz, 1 H), 5.94 (dd, J=14.8 Hz, J=4.0 Hz, 1H), 5.72 (dd, J=20.4 Hz, J=4.0 Hz, 1H), 2.90 (t, J=5.2 Hz, 4 H), 2.24 (q, J=7.2 Hz, 2H), 2.21-2.17 (m, 4H), 1.00 (t, J=7.2 Hz, 3H), 0.13 (s, 6H) ppm. $^{13}$C NMR (101 MHz, 20° C., $C_6D_6$): δ=139.32 (CH, vinyl), 132.19 (CH$_2$, vinyl), 57.22 (2 CH$_2$), 53.26 (CH$_2$), 45.82 (2 CH$_2$), 12.34 (CH$_3$), −2.33 (2 CH$_3$) ppm. GC-MS (EI, 70 eV): m/z (%) =198 (M$^+$, 100), 183 (M$^+$ —CH$_3$, 71), 113 (C$_4$H$_{13}$N$_2$$^+$, 72), 85 (C$_4$H$_6$Si$^+$, 79), 59 (49). IR (ATR, cm$^{-1}$): 3048 (w), 2944 (m), 2803 (m), 1447 (w), 1377 (m), 1249 (m), 1150 (s), 1101 (m), 1009 (m), 972 (s), 816 (vs), 772 (vs), 700 (m).

(Dibenzylamino)(dimethyl)vinylsilane (1o)

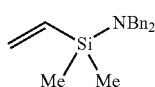

Dibenzylamine (11.4 g, 58.0 mmol, 1.0 equiv.) was added dropwise to a solution of chlorodimethylvinylsilane (7.00 g, 58.0 mmol, 1.0 equiv.) and triethylamine (6.46 g, 63.8 mmol, 1.1 equiv.) in DCM (70 ml) at ambient temperature. The mixture was stirred for 18 h. After addition of hexanes (60 ml) and filtration the solvent was removed under reduced pressure. Distillation at reduced pressure furnished 1o (15.6 g, 55.2 mmol, 95%) as a colorless oil (bp 163-166° C. (9 mbar)). C$_{18}$H$_{23}$NSi, M$_w$=281.47 g mol$^{-1}$ $^1$H NMR (400 MHz, 20° C., C$_6$D$_6$): δ=7.21-7.08 (m, 10H), 6.26 (dd, J=20.4 Hz, J=14.8 Hz, 1H), 5.93 (dd, J=14.8 Hz, J=3.6 Hz, 1H), 5.72 (dd, J=20.4 Hz, J=4.0 Hz, 1H), 3.83 (s, 4H), 0.24 (s, 6 H) ppm. $^{13}$C NMR (101 MHz, 20° C., C$_6$D$_6$): δ=141.00 (2 C, Ph), 139.40 (CH, vinyl), 132.55 (CH$_2$, vinyl), 128.54 (4 CH, Ph), 128.28 (4 CH, Ph), 126.90 (2 CH, Ph), 49.74 (2 CH$_2$), −1.34 (2 CH$_3$) ppm. GC-MS (EI, 70 eV): m/z (%)=281 (M$^+$, 47), 266 (M$^+$ —CH$_3$, 12), 204 (97), 190 (M$^+$ —C$_7$H$_7$, 50), 91 (C$_7$H$_7$$^+$, 100), 85 (C$_4$H$_9$Si$^+$, 36). IR (ATR, cm$^{-1}$): 3027 (w), 2954 (w), 2847 (w), 1602 (w), 1493 (m), 1452 (m), 1251 (m), 1198 (m), 1137 (m), 1060 (m), 954 (s), 822 (vs), 773 (s), 731 (m), 695 (vs).

(Diallylamino)(dimethyl)vinylsilane (1p)

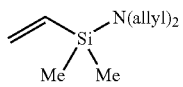

Diallylamine (6.76 g, 69.9 mmol, 1.2 equiv.) was added dropwise to a solution of chlorodimethylvinylsilane (7.00 g, 58.0 mmol, 1.0 equiv.) and triethylamine (7.04 g, 69.6 mmol, 1.2 equiv.) in DCM (70 ml) at ambient temperature. The mixture was stirred for 18 h. After addition of hexanes (60 ml) and filtration the solvent was removed under reduced pressure. Distillation at reduced pressure furnished 1p (8.90 g, 49.1 mmol, 85%) as a colorless liquid (bp 92-94° C. (75 mbar)). C$_{10}$H$_{19}$NSi, M$_w$=181.35 g mol$^{-1}$ $^1$H NMR (400 MHz, 20° C., C$_6$D$_6$): δ=6.15 (dd, J=20.4 Hz, J=14.8 Hz, 1 H), 5.92 (dd, J=14.8 Hz, J=4.0 Hz, 1H), 5.70 (dd, J=20.4 Hz, J=4.0 Hz, 1 H), 5.66 (ddt, J=17.2 Hz, J=10.0 Hz, J=5.8 Hz, 2H), 5.06 (dq, J=17.2 Hz, J=2.0 Hz, 2H), 5.02 (ddt, J=10.0 Hz, J=2.0 Hz, J=1.2 Hz, 2H), 3.33 (dt, J=6.0 Hz, J=1.4 Hz, 4H), 0.14 (s, 6 H) ppm. $^{13}$C NMR (101 MHz, 20° C., C$_6$D$_6$): δ=139.52 (CH, vinyl), 138.24 (2 CH, allyl), 132.11 (CH$_2$, vinyl), 115.13 (2 CH$_2$, allyl), 49.14 (2 CH$_2$), −1.72 (2 CH$_3$) ppm. GC-MS (EI, 70 eV): m/z (%)=181 (M$^+$, 20), 166 (M$^+$ —CH$_3$, 34), 154 (93), 138 (9), 112 (13), 85 (C$_4$H$_9$Si$^+$, 100), 59 (54). IR (ATR, cm$^{-1}$): 3077 (w), 2957 (m), 2843 (w), 1637 (m), 1415 (m), 1356 (m), 1249 (m), 1149 (m), 1054 (m), 914 (s), 820 (vs), 773 (s), 690 (m).

2) Polymerization Procedures and Performance Evaluation

General Polymerization Procedure

Cyclohexane, butadiene and styrene (amount given in Tables 2 and 3) were charged to an air-free 10 l reactor and the stirred mixture was heated up to 40° C. Then TMEDA and aminosilyl monomer (amounts and materials given in Tables 2 and 3) were added and n-butyllithium was charged dropwise to react the impurities until the color of the reaction mixture changed to yellowish (titration). Subsequently, the desired amount of initiator in cyclohexane corresponding to the target molecular weight of the polymer was charged immediately to start the polymerization. The start time of the charge of the initiator was defined as the start time of the polymerization. In parallel the temperature was increased by heating or cooling in the wall of the reactors beginning with the charge of the initiator to the final polymerization temperature of 60° C. for about 80 min until quantitative conversion was indicated. Then only for polymer Ref. B chain-end modifier dimethoxydimethylsilane (DMDS, amount given in Table 2) was added. The reaction was terminated after 20 min by addition of methanol. The polymer solution was stabilized with Irganox 1520D, the polymer recovered by steam stripping and dried until a content of residual volatiles <0.6% was obtained. The complete data set of the samples is given in Tables 2 and 3.

TABLE 2

| Polymerization 1. | | | | | | |
| --- | --- | --- | --- | --- | --- | --- |
| | Ref A | Ref B | Ref C | Ref D | E | F |
| Cyclohexane/g | 4794 | 4779 | 4779 | 4777 | 4778 | 4780 |
| Butadiene/g | 592 | 590 | 589 | 590 | 589 | 590 |
| Styrene/g | 254 | 253 | 253 | 253 | 253 | 253 |
| TMEDA/mmol | 6.35 | 5.75 | 5.94 | 5.94 | 5.94 | 5.75 |
| nBuLi/mmol | 4.23 | 3.83 | 3.96 | 3.96 | 3.96 | 3.83 |
| Monomer/mmol | — | — | 1g 8.24 | 1h 7.92 | 1j 8.24 | 1i 7.66 |
| Chain end modifier/mmol | — | DMDS 4.60 | — | — | — | — |
| Mp (PS)/kg/mol | 303 | 329 | 305 | 298 | 310 | 295 |
| Coupling rate/% | 1.6 | 1.4 | 1.4 | 2.4 | 1.7 | 1.1 |

TABLE 2-continued

Polymerization 1.

|  | Ref A | Ref B | Ref C | Ref D | E | F |
|---|---|---|---|---|---|---|
| Vinyl content/% | 55.3 | 54.9 | 55.5 | 54.8 | 54.8 | 54.3 |
| Styrene content/% | 29.4 | 29.6 | 28.8 | 29.5 | 29.5 | 29.5 |
| $M_L$/MU (directly after coagulation) | 55.2 | 63.1 | 52.7 | 55.2 | 55.7 | 56.4 |

TABLE 3

Polymerization 2.

|  | G | H |
|---|---|---|
| Cyclohexane/g | 4777 | 4777 |
| Butadiene/g | 589 | 590 |
| Styrene/g | 253 | 253 |
| TMEDA/mmol | 5.94 | 5.93 |
| nBuLi/mmol | 3.96 | 3.95 |
| Monomer/mmol | 1m 7.92 | 1k 8.02 |
| Chain end modifier/mmol | — | — |
| Mp(PS)/kg/mol | 303 | 297 |
| Coupl. rate/% | 1.1 | 2.1 |
| Vinyl content/% | 54.5 | 55.0 |
| Styrene content/% | 29.1 | 29.8 |
| ML/MU (directly after coagulation) | 53.1 | 57.8 |

Modifier 1g: diethylaminodimethylvinylsilane; 1h: Bis(diethylamino)methylvinylsilane Modifiers 1g and 1h were prepared similarly to 1j-1k.

Mixing Recipe for Silica Compounds in phr

TABLE 4

Ingredients for mixing and curing of polymers:

1st mixing stage (non-productive mixing):

| | |
|---|---|
| SSBR | 80 |
| High cis 1,4-polybutadiene (Buna™ cis 132-Schkopau, Trinseo Deutschland GmbH) | 20 |
| Precipitated silica (Silica 7000 GR, Evonik Industries) | 80 |
| Silane (Si 75, bis(triethoxysilylpropyl)disulfane, Evonik Industries) | 6.9 |
| Stearic acid (Cognis GmbH) | 1.0 |
| Antiozonant (Dusantox 6 PPD [N-(1,3-dimethylbutyI)-N'-phenyl-1,4-phenylenediamine], Duslo a.s.) | 2.0 |
| Zinc oxide (Grillo-Zinkoxid GmbH) | 2.5 |
| Ozone protecting wax (Antilux 654, Lanxess AG) | 1.5 |
| Softener (TDAE oil, VivaTec500, Hansen & Rosenthal KG) | 20 |

2nd mixing stage (productive mixing):

| | |
|---|---|
| Sulfur (Solvay AG) | 1.4 |
| Accelerator (TBBS, N-tert-butyl-2-benzothiazolesulfenamide, Lanxess AG) | 1.5 |
| DPG (diphenylguanidine, Vulkacit D, Lanxess AG) | 1.5 |

Performance of Silica-Filled Compounds

TABLE 5

Performance Data of Compounds made by polymers of invention and reference polymers.

| Cured Rubber of Polymer | ML after coagulation [MU] | ML after 6 months [MU] | CML [MU] | Rebound 70° C. [%] | HBU [° C.] | Proc.-Perf. Index (CML* tan delta 60° C.)−1 | Tan delta 0° C. (DMA) | Tan delta 60° C. (DMA) | Abrasion [mm³] |
|---|---|---|---|---|---|---|---|---|---|
| Ref A* (unmodified) | 55.2 | 58.8 | 70.7 | 57.9 | 129.4 | 100 | 0.489 | 0.174 | 135 |
| Ref B* (chain end-modified) | 63.1 | 69.0 | 90.1 | 58.3 | 121.1 | 95 | 0.462 | 0.144 | 134 |
| Ref C (state of the art) | 52.7 | 55.8 | 85.4 | 63.5 | 115.1 | 123 | 0.424 | 0.117 | 138 |
| Ref D (state of the art) | 55.2 | 97.4 | 98.1 | 63.8 | 112.8 | 104 | 0.491 | 0.121 | 131 |
| E | 55.7 | 57.7 | 80.0 | 62.3 | 115.1 | 122 | 0.451 | 0.126 | 138 |
| F | 56.4 | 62.2 | 85.5 | 65.0 | 114.4 | 138 | 0.438 | 0.104 | 121 |
| G | 53.1 | 57.1 | 79.5 | 63.1 | 117.5 | 125 | 0.433 | 0.124 | 132 |
| H | 57.8 | 76.3 | 93.8 | 64.4 | 114.6 | 121 | 0.448 | 0.108 | 125 |

*Ref A & Ref B polymers manufactured w/o aminosilyl monomer. Processing-performance index for Ref A set to 100 (the higher the better)

Compared to unmodified sample Ref A, chain end-modified sample Ref B and both state-of-the-art samples Ref C and Ref D clearly indicate more pronounced rubber-filler interaction caused by corresponding modifications which are reflected in higher compound viscosities. A similar trend as for samples Ref B, Ref C and Ref D is observed for samples E, F, G and H which exhibit compound viscosities ranging from 79.5 MU (G) to 93.8 MU (H) and are therefore also significantly higher than for the unmodified Ref A, underlining that the individual aminovinylsilane comonomers support effective rubber-filler interaction. Samples E and G further display rebound resiliences @70° C. of 62.3% and 63.1%, respectively, which are well on par with those of state-of the-art samples Ref C and Ref D (63.5% and 63.8%). In contrast, the rebound resilience values @70° C. of samples F and H are clearly higher by 1-2% which can be ascribed to higher elasticity due to even more effective rubber-filler interaction originating from the respective aminovinylsilanes. This trend ties in well with the lower dynamic heat build-up, slightly higher compound viscosities and the tan delta @60° C. reduced by up to 17% vs. samples E and G. As compared to state-of the-art samples Ref C and Ref D, samples F and H still exhibit significantly improved tan delta @60° C. values, although the leap from chain end-modified Ref B and especially the unmodified Ref A is even more pronounced.

Upon relating the processing indicator, compound viscosity CML1+4, and the rolling resistance indicator, tan delta @60° C., by multiplying both inverse values to afford a processing-performance index (proc-perf index) giving the balance between both key sizes (the higher, the better), especially sample F of the invention clearly outperforms all other state of the art samples with a proc-perf index of 138 and therefore offers the best solution of the target conflict between processing and performance indication. All samples E to H of the invention offer an excellent processing performance balance without exuding secondary amines with high concern under TRGS-552.

Due to very similar dynamic $T_g$s of the vulcanizates of all samples compared herein, the wet grip indicator tan delta @0° C. and the wear indicator DIN do not suggest any noteworthy trends apart from deviations ranging within the expected range given by the method, i.e. the deviations observed are not significant, as expected.

Test Methods

A) Amine Analytics Bound in Polymer

After steam-mediated removal of cyclohexane, the dry polymer was dissolved in toluene (5 wt %). A defined amount of polymer solution was prepared. Two drops of isobutylchloroformate (IBCF) were added and the mixture was shaken for 20 min at room temperature. Derivatization of amines present and extraction of resulting carbamates to the organic phase took place simultaneously. 400 μl of alkaline methanol were added. The mixture was shaken for 5 min for destroying excess IBCF. The toluene phase was transferred into a new 10 mL centrifuge vial and was mixed with 1 mL aqueous NaOH solution for 5 min as a washing step. The toluene phase was transferred into vial and analyzed.

B) Amine Emissions (Air) While Mixing

Mixing experiments (one stage mixing process) for air emission analytics were performed with a Haake Rheomix OS (Thermo Scientific) with a 78 cm$^3$ mixing chamber. Ingredients: 100 phr SSBR, 80 phr Ultrasil 7000 GR, 6.4 phr Si75, 1.5 phr stearic acid. Mixing time: 30 min, Temperature minimum 150° C. The experimental setup was tested with an amine-spiked rubber sample. An amount of 2000 ppm of each amine (diethylamine, methylpiperazine, ethylpiperazine) was added. Detected: DEA (300 mg/m$^3$); Methylpiperazine (8 mg/m$^3$); Ethylpiperazine (0.4 mg/m$^3$)

C) Soxhlet Extraction of Amines and Nitrosamines of Polymer

Polymer Ref D was stored for 3 days (Diesel fume simulation) in a round bottom flask containing nitrous gases. Subsequently, the polymer was continuously extracted 24 h with methanol (Soxhlet procedure) in the presence of ascorbic acid to prevent oxidation of non-nitrosated amines. The sample was analyzed with calibrated GC/MS.

TABLE 6

| | Analytical data (amine and nitrosamine determination) | | | |
|---|---|---|---|---|
| Polymer | Calc. Amount amine [mg/kg] | Amine in polymer [mg/kg (%)] | Nitrosamine in air [mg/m$^3$] | Nitrosamine in polymer [mg/kg] |
| Ref C | 715 (DEA) | 8 (1) | Not measured | Not measured |
| Ref D | 1370 (DEA) | 110 (8) | 57 | 70 |
| E | 980 (MePip) | 70 (7) | Not measured | Not measured |
| H | 1900 (MePip) | 195 (10) | Not found | Not found |

DEA: N,N-diethylamine, MePip: N-Methylpiperazine; detection limits (for 10 l volume of air): DEA: 1.2 mg/m$^3$; MePip: 1.8 mg/m$^3$.

According to technical rules for hazardous compounds (TRGS-552) the limits for nitrosamines cat 1 and 2 (e.g. from diethylamine, dibutylamine) in the rubber and tire industry are 0.5-1 μg/m$^3$ air. As shown above, aminovinylsilanes outside the scope of Formula 1 cannot be safely applied in industrial scale.

Sample Preparation (Air Measurements for Activated Carbon Tubes)

Sample tubes with activated carbon (Draeger BIA) were placed in the atmosphere on top of the mixing chamber. Air samples were taken (Draeger pump X-act 5000) for 15 min with continuous flow of 0.8-1.0 l/min. The tubes were closed with suitable caps and stored in a laboratory refrigerator for two days. For solvent desorption of the activated carbon, the tubes were opened with a glass cutter. The collecting and breakthrough zones were transferred into separate 11 ml vials.

2 mL of a dichloromethane/methanol (75:25)—mixture were added followed by immediate sealing of the vials with septum caps. Vials were left standing for desorption at room temperature and occasionally shaken by hand. Desorption solutions were filtrated directly into a GC-Vial prior to GC-MS analysis.

GC-MS analysis was performed using an Agilent 6890 Gas Chromatograph equipped with a 5973N mass spectrometer. A 5% phenyl-methylsiloxane (HP-5) capillary column (30 m×0.32 mm I.D.×0.25 μm film thickness) was used for separation. Chromatographic conditions were as follows: Initial column temperature was 40° C. for 0.5 min, increased by 2.5° C./min to 60° C., then to 100° C. at 5° C./min, to 200° C. at 15° C./min and finally to 280° C. at 35° C./min. The temperatures of the injection port and detector were set at 250° C. and 230° C., respectively. Injection of 1 μL of the sample solution was performed automatically in split mode (1:50). The mass spectrometer was operated in the electron ionization mode EI). Acquisition was carried out in scan mode, the mass range from 40 to 400 m/z was collected.

Sample Preparation (Air Measurements for Silica Tubes)

Sample tubes with modified silica (Draeger ADS) were placed in the atmosphere on top of the mixing chamber. Air samples were taken for 15 min with continuous flow of 0.8-1.0/min. The tubes were closed with suitable caps and stored in a laboratory refrigerator for two days. For desorption of the modified silica carbon, the tubes were opened with a glass cutter. The collecting and breakthrough zones were transferred into separate 50 ml centrifuge vials and 40 mL of alkaline water (NaOH) were added. Vials were shaken for 30 min at room temperature. 30 mL of the desorption solution were used for derivatization applying the following procedure: To the aqueous desorption solution 200 μL NaOH, 3 mL toluene and two drops of isobutylchloroformate (IBCF) were added and the mixture is shaken for 20 min at room temperature. Derivatization of present amines and extraction of resulting carbamates to the organic phase takes place simultaneously. The supernatant phase was transferred to a 10 mL centrifuge vial and 400 μl of alkaline methanol were added. The mixture was shaken for 5 min in order to destroy excess IBCF. The toluene phase was transferred into a new 10 mL centrifuge vial and was mixed with 1 mL of aqueous NaOH solution for 5 min as a washing step. The toluene phase was transferred into vial and analyzed.

GC-MS analysis was performed using an Agilent 6890 Gas Chromatograph equipped with a 5973N mass spectrometer. A 5% phenyl-methylsiloxane (HP-5) capillary column (30 m×0.32 mm I.D.×0.25 μm film thickness) was used for separation. Chromatographic conditions were as follows: initial column temperature was 40° C. for 1 min, increased by 10° C./min to 180° C. and finally to 300° C. at 30° C./min. The temperatures of the injection port and detector were set at 250° C. and 230° C. respectively. Injection of 2 μL of the sample solution was performed automatically in split mode (1:50). The mass spectrometer was operated in the electron ionization mode (EI). Acquisition was carried out in sim mode (57; 118; 158 for diethylamine-carbamate and 58; 70; 200 for methylpiperazine-carbamate).

The molecular weight analyses were carried out by SEC/RI using a HEWLETT PACKARD HP 1100. The eluent THF was degassed on line. The solvent flow rate was 1.0 ml/min. 100 μL of polymer solution were injected per analysis. The analyses were carried out at 40° C. The molecular weights were initially calculated based on a polystyrene calibration and given in the tables as polystyrene. The real molecular weights (SSBR molecular weights) can be determined dividing by a factor derived from an earlier comparison between molecular weights from SEC/RI and SEC/MALLS. The value of the factor depends on the polymer composition (styrene and butadiene content) and to some extent to the molecular weight. A factor of 1.52 can be used for SSBR with 21% and 30% styrene.

NMR-spectroscopy was performed on a BRUKER Avance 400 in a 5 mm BBO probe. Solvents, frequencies and temperature are given in the characterization data.

FTIR-spectroscopy measured in attenuated total reflection was used to determine the vinyl content and styrene content.

The glass transition temperature was determined using the DSC Q2000 under the following conditions:
Weight: ca. 10-12 mg
Sample container: Alu/S
Temperature range: (−140 . . . 80) ° C.
Heating rate: 20 K/min respectively 5 K/min
Cooling rate: free cooling
Purge gas: 20 ml Ar/min
Cooling agent: liquid nitrogen
Each sample was measured at least once. The measurements contain two heating runs.

The 2nd heating run was used to determine the glass transition temperature.

Measurements of non-vulcanized rheological properties according to ASTM D 5289-95 were made using a rotor-less shear rheometer (MDR 2000 E) to characterize cure characteristics.

The invention claimed is:

1. A process for preparing an elastomeric polymer, said process comprising polymerizing one or more conjugated diene monomers, one or more aminosilyl monomers of the following Formula 1 and optionally one or more aromatic monovinyl monomers in the presence of one or more initiator compounds:

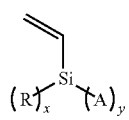

Formula 1 wherein x and y are integers with x+y=3 and y≥1; each R is independently $C_1$-$C_{30}$ hydrocarbyl; and each A is independently an amino group selected from one of the following Formulas 3 to 8:

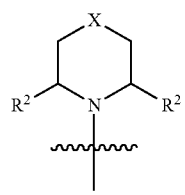

Formula 3 wherein each $R^2$ is independently selected from $C_1$-$C_8$ alkyl and —$CH_2$—O—$(CH_2)_{1-6}$—H, and X is selected from a bond, —O—, —$CH_2$— and —$CH_2CH_2$—,

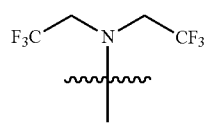

Formula 4

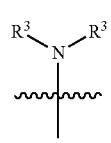

Formula 5 wherein each $R^3$ is independently selected from a group consisting of allyl, cyclohexyl, $C_8$-$C_{20}$ alkyl and —$(CH_2)_2$—$Y_m$—$CH_3$, wherein Y is independently selected from a group consisting of —$CH_2$—, —O— and —S—, m is an integer selected from 5 to 17 and at least one Y is selected from a group consisting of —O— and —S—, with the proviso that any group —O— and —S— is linked only to —$CH_2$— or —$CH_3$, Formula 6

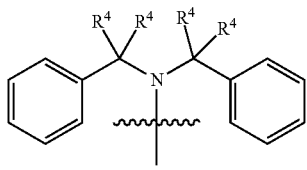

wherein each $R^4$ is independently selected from H and $C_1$-$C_8$ alkyl,

Formula 7

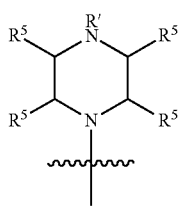

wherein R' is selected from a group consisting of methyl, ethyl, propyl, butyl, pentyl, hexyl and benzyl; and each $R^5$ is independently selected from a group consisting of H, methyl, ethyl and propyl;

Formula 8

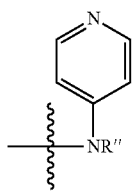

wherein R" is selected from linear or branched $C_1$-$C_8$ alkyl.

2. The process according to claim 1, wherein the polymerization is an anionic, radical or transition metal-catalyzed polymerization, preferably an anionic polymerization.

3. The process according to claim 1, wherein the conjugated diene monomers comprise 1,3-butadiene or isoprene.

4. The process according to claim 1, wherein the conjugated diene monomers are polymerized in a total amount of 30 to 99.99 wt. %, based on the total weight of polymerized monomers.

5. The process according to claim 1, wherein the aromatic monovinyl monomer is styrene.

6. The process according to claim 1, wherein the aromatic monovinyl monomers are polymerized in a total amount of up to 70 wt. % based on the total weight of polymerized monomers.

7. The process according to claim 1, wherein the aminosilyl monomers of Formula 1 are polymerized in a total amount of 0.5 to 100 equivalents per equivalent of initiator.

8. The process according to any one of claims 1 to 7, wherein the initiator compound is selected from methyllithium, ethyllithium, n-butyllithium, s-butyllithium, tert-butyllithium, tert-octyllithium, isopropyllithium, phenyllithium, cyclohexyllithium, 2-butyllithium, 4-phenylbutyllithium, tert-butyldimethylsilyloxypropyllithium, dialkylaminopropyllithium, bis(tri-N-alkylsilyl)aminopropyllithium, N-morpholinopropyllithium, sodium biphenylide, sodium naphthalenide, potassium naphthalenide, 1,3-bis(1-(phenyl)1-lithiohexyl)benzene, 1,3-bis(1-(4-ethylphenyl)1-lithiohexyl)benzene, 1,3-bis(1-(4-methylphenyl)1-lithiohexyl)benzene, 1,3-bis(1-(4-propylphenyl)1-lithiohexyl)benzene,1,3-bis(1-(4-(tert-butyl)phenyl)1-lithiohexyl)-benzene, 1,3-bis(1-(4-(diethylamino)phenyl)1-lithiohexyl)-benzene, 1,3-bis(1-(4-(dimethylamino)phenyl)1-lithiohexyl)benzene,1,3-bis(1-(4-ethoxy-phenyl)1-lithiohexyl)benzene, 1,3-bis(1-(4-(dimethoxy)phenyl)1-lithiohexyl)benzene, (((dimethylamino)dimethylsilyl)methyl)lithium, (((diethylamino)dimethylsilyl)methyl)lithium, (((dibutylamino)dimethylsilyl)methyl)lithium, (((dihexylamino)dimethylsilyl)methyl)lithium, (((dioctylamino)dimethylsilyl)methyl)lithium, (((dibenzylamino)dimethylsilyl)methyl)lithium, ((dimethyl-(piperidin-1-yl)silyl)methyl)lithium, ((dimethyl(morpholino)silyl)methyl)lithium, ((dimethyl(4-methylpiperazin-1-yl)silyl)methyl)lithium, ((dimethyl(4-ethylpiperazin-1-yl)silyl)-methyl)lithium, and ((dimethyl(4-benzylpiperazin-1-yl)silyl)methyl)lithium.

9. The process according to claim 1, wherein one or more chain end-modifying agents are added during the polymerization.

10. An elastomeric polymer obtainable by the process according to claim 1.

11. A non-vulcanized polymer composition comprising the elastomeric polymer as defined in claim 10 and one or more components comprising (i) components which are added to or formed as a result of the polymerization process used for making said polymer, (ii) components which remain after solvent removal from the polymerization process and (iii) components which are added to the polymer after completion of the polymer manufacturing process.

12. The polymer composition according to claim 11, comprising one or more components comprising extender oils, stabilizers, resins, processing aids or further polymers.

13. The polymer composition according to claim 11, further comprising one or more fillers.

14. The polymer composition according to claim 13, wherein the one or more fillers comprise carbon black, carbon nanotubes, graphite, graphene, silica, carbon-silica dual-phase filler, clays calcium carbonate, magnesium carbonate, lignin, glass particle-based fillers and starch or cellulose-based fillers.

15. The polymer composition according to claim 11, further comprising one or more vulcanizing agents.

16. A vulcanized polymer composition obtainable by vulcanizing the polymer composition as defined in claim 15.

17. A method of making a vulcanized polymer composition, comprising the step of vulcanizing the polymer composition as defined in claim 15.

18. An article comprising at least one component formed from the vulcanized polymer composition as defined in claim 16.

19. The article according to claim 18, comprising a tire, a tire tread, a tire side wall, a tire carcass, a belt, a gasket, a seal, a hose, a vibration damper, a footwear component, a golf ball and a hose.

* * * * *